(12) United States Patent
Dorn et al.

(10) Patent No.: US 12,459,466 B2
(45) Date of Patent: Nov. 4, 2025

(54) DISC BRAKE FOR A MOTOR VEHICLE

(71) Applicant: ZF CV Systems Europe BV, Brussels (BE)

(72) Inventors: Philip Dorn, Mannheim (DE); Paul Henning, Schwetzingen (DE); Mirko Seip, Brombach (DE)

(73) Assignee: ZF CV Systems Europe BV, Brussels (BE)

( * ) Notice: Subject to any disclaimer, the term of this patent is extended or adjusted under 35 U.S.C. 154(b) by 604 days.

(21) Appl. No.: 17/895,130

(22) Filed: Aug. 25, 2022

(65) Prior Publication Data

US 2023/0067490 A1 Mar. 2, 2023

(30) Foreign Application Priority Data

Aug. 25, 2021 (DE) ...................... 10 2021 121 995.7

(51) Int. Cl.
*F16D 65/097* (2006.01)
*B60T 1/06* (2006.01)
*F16D 55/225* (2006.01)
*F16D 55/00* (2006.01)
*F16D 65/00* (2006.01)
*F16D 127/02* (2012.01)

(52) U.S. Cl.
CPC ............ *B60T 1/065* (2013.01); *F16D 55/225* (2013.01); *F16D 2055/0037* (2013.01); *F16D 65/0081* (2013.01); *F16D 65/0978* (2013.01); *F16D 2127/02* (2013.01)

(58) Field of Classification Search
CPC .. F16F 1/128; F16D 65/0974; F16D 65/0976; F16D 65/0972; F16D 55/225; B60T 1/065
See application file for complete search history.

(56) References Cited

U.S. PATENT DOCUMENTS

| 10,962,068 | B2 * | 3/2021 | Brandl | ............... F16D 65/0977 |
| 2015/0001010 | A1 * | 1/2015 | Liao | ....................... F16D 65/18 188/72.3 |
| 2019/0056000 | A1 * | 2/2019 | Beyer | ................. F16D 65/0973 |

(Continued)

FOREIGN PATENT DOCUMENTS

| DE | 102016124310 A1 | 6/2018 |
| DE | 102019131840 A1 | 5/2021 |

(Continued)

*Primary Examiner* — Nicholas J Lane
(74) *Attorney, Agent, or Firm* — Dickinson Wright PLLC

(57) ABSTRACT

A disc brake (1) includes a brake disc (2), a brake caliper (3), two brake pads (4, 4') that are movably guided on the brake caliper (3), a retainer spring (6, 6') on each brake pad (4, 4'), a retainer bracket (8-8$^{IV}$) for pre-tensioning the retainer springs (6, 6') in relation to the respective brake pad (4, 4'), and an expander spring (10, 10') that applies an expansion force between the brake pads (4, 4') and diverging the brake pads (4, 4'). The ends of the expander spring (10, 10') may bear in each case directly on one of the retainer springs (6, 6'). The disc brake (1) may have a loss prevention device that is operatively connected to the expander spring (10, 10') such that the expander spring (10, 10'), in the absence of the expansion force, is held on the disc brake (1).

18 Claims, 11 Drawing Sheets

(56) References Cited

U.S. PATENT DOCUMENTS

2021/0246952 A1 8/2021 Adkins et al.
2022/0412414 A1* 12/2022 Meissner ............ F16D 65/0975

FOREIGN PATENT DOCUMENTS

| WO | 2017178096 A1 | 10/2017 | | |
| WO | 2018077728 A1 | 5/2018 | | |
| WO | WO-2021104857 A1 * | 6/2021 | ........... | F16D 55/226 |

* cited by examiner

DISC BRAKE FOR A MOTOR VEHICLE

CROSS-REFERENCE TO RELATED APPLICATIONS

This application claims the benefit of previously filed German Patent Application No. DE 10 2021 121 995.7, filed Aug. 25, 2021, the entire content of which is hereby incorporated by reference in its entirety.

FIELD

The present disclosure relates to a disc brake for a motor vehicle, in particular a commercial vehicle, having a brake disc, a brake caliper and two brake pads which on both sides of the brake disc are movably guided on the brake caliper, a retainer spring on each brake pad, a retainer bracket for pre-tensioning the retainer spring in relation to the respective brake pad, and an expander spring which is specified for applying an expansion force in an effective direction between the brake pads and diverging the brake pads. The present disclosure furthermore relates to a kit for a brake caliper of a disc brake.

BACKGROUND

Disc brakes having brake pads on opposite sides of a brake disc are known, for example from WO 2017/178096 A1, in which the brake pads, which are disposed on both sides of a brake disc, upon activation are converged and a braking effect is achieved by moving the brake pads in the direction of the brake faces on the brake disc. Upon releasing the brake it should be avoided that the brake pads, which are movably guided on the brake caliper of the disc brake, even in the absence of pressure, remain in contact with the brake faces of the brake disc so as to drag on said brake faces. For this purpose, the known disc brakes have at least one expander spring which is specified for applying an expansion force between the brake pads and diverging the brake pads such that the contact between the brake faces of the brake disc and the brake pads is cancelled in the best case.

The solutions known from the prior art generally function in a satisfactory manner. However, it can occasionally arise that the expansion force acting on the brake pads is compromised, for example when the expander spring transmits the expansion force to the brake pads and/or the retainer spring while using coupling means that interact with the expander spring. The coupling means are usually guided on a retainer bracket disposed on the brake caliper. During the operation of the vehicle, it can arise under certain circumstances that the coupling means jam in the guide on the guide faces between the coupling means and the retainer bracket, for instance by virtue of contamination or corrosion. Furthermore, a breakage of a retainer spring, for example, can lead to the coupling means being disengaged from the retainer spring, then being unintentionally released from the disc brake.

SUMMARY

In view of the above, it is an object of the present disclosure to specify a disc brake which ideally largely mitigates the problems described above. In particular, it is an object of the present disclosure to specify a disc brake which achieves an improved operational reliability and at the same time a non-compromised expansion effect during the operation.

According to a first aspect, the present disclosure achieves the underlying object by providing a disc brake having the features specified herein. The invention is in particular distinguished in that the ends of the expander spring bear in each case directly on one of the retainer springs.

One aspect of the present disclosure is the approach of henceforth operatively connecting the expander spring directly to the retainer spring without the intervention of any potential coupling means. The design embodiment of the disc brake is simplified in terms of construction by the direct connection and the action of the expander spring on the retainer spring thus achieved. Moreover, separate guiding of the coupling means, which is occasionally of a complex design, and production of said coupling means can henceforth be excluded. As a result, any potential jamming by way of the coupling means is avoided, as a result of which the operational reliability of the disc brake is improved.

According to a second aspect, the present disclosure achieves its underlying object by specifying a disc brake for a motor vehicle wherein the disc brake for the expander spring has a loss prevention device which is operatively connected to the expander spring in such a manner that the expander spring in the absence of the expansion force is held on the disc brake.

The second aspect is an independent aspect of the present disclosure and at the same time a preferred embodiment of the first aspect, and vice versa.

The present disclosure according to the second aspect that is independent thus proposes a disc brake for a motor vehicle, in particular a commercial vehicle, having a brake disc, a brake caliper and two brake pads which are on both sides of the brake disc movably guided on the brake caliper, a retainer spring on each brake pad, a retainer bracket for pre-tensioning the retainer springs in relation to the respective brake pad, and an expander spring which is specified for applying an expansion force between the brake pads and diverging the brake pads, wherein the disc brake for the expander spring has a loss prevention device which is operatively connected to the expander spring in such a manner that the expander spring in the absence of the expansion force is held on the disc brake.

The present disclosure in the second aspect utilizes the concept that, with the aid of the loss prevention device, it is avoided that the expander spring jumps or drops off the disc brake. The loss prevention device preferably fulfils the function thereof independently of whether the expander spring breaks on the disc brake per se, thus no longer generates any expansion force by itself, or whether one of the retainer springs on the disc brake has a defect, so that—despite an intact expander spring—the latter can no longer be held directly by the brake pads and apply spring force of said expander spring to the brake pads to be diverged. The expander spring by way of the loss prevention device is preferably permanently reliably held on the disc brake.

The preferred embodiments described hereunder relate in each case to refinements of the first as well as of the second aspect described above.

According to one preferred embodiment, it is provided that the expander spring on each end thereof has a holding portion that can be brought in contact with the retainer springs. The expander spring, by way of the holding portion thereof, preferably establishes a connection with the retainer spring that is based on a form-fit, wherein said expander spring is prevented from moving transversely to the expansion force generated, for instance, and from unintentionally sliding from the retainer spring. In this way, a permanently reliable and above all direct connection between the ends of the expander spring and the retainer springs is effected, as long as the retainer spring and/or the expander spring are/is intact.

Each holding portion is preferably integrally molded in an end portion of the expander spring and is specified for encompassing the retainer spring at least in regions. The holding portion, which is preferably configured as a bend on a respective end portion of the expander spring, engages on a central portion of the retainer spring, for instance. In one preferred embodiment, the end portions of the expander spring engage on mutually facing lateral portions of the retainer springs disposed on the brake pads.

The holding portion is in particular configured for engaging laterally across the retainer spring on the upper and the lower side of the latter. The holding portion, which is configured as a bend, like the spring body of the expander spring per se, is produced from the spring material of the expander spring. The holding portion is preferably configured so as to be integral to the spring body that diverges the brake pads of the disc brake.

According to one preferred embodiment, the holding portion is disposed outside the center of mass of the expander spring. In other words, the holding portion does not run through the center of mass. It is achieved in this way that the expander spring, in particular in embodiments in which said expander spring is configured as a coil spring or a leaf spring, has a spring body which can be disposed at an offset relative to the brake pads or the retainer springs, preferably so as to be radially outside said brake pads or retainer springs. Simplified assembling can be achieved in that the expander spring is disposed so as to be offset from the retainer springs.

In one preferred embodiment, the expander spring, by way of the holding portions thereof configured as a bend, is specified for being hooked in a form-fitting manner into the retainer springs on the brake pads. The holding portions are disposed in particular at a radial offset from the longitudinal axis of the spring body of the expander spring generating the expansion force.

According to one further preferred embodiment, the disc brake furthermore has a guide part which is specified for receiving the expander spring so as to be at least in portions guided in the effective direction of the expansion force. The guide part has the effect that the expander spring can move (elongate) without impediment in the effective direction of the expansion force generated by said expander spring. Jamming of the spring along the guide part would be avoided even when potential contamination were to adhere to the expander spring or the guide part. Moreover, the guide part on the expander spring, by way of holding portions disposed outside the center of mass of the expander spring, ensures that the spring body of the expander spring does not deflect perpendicularly to the direction of force acting longitudinally to the expansion force. The guide part in this way counteracts any impermissible deformation of the expander spring.

The guide part is preferably configured as a bar element and is at least partially surrounded by the expander spring. A high flexural strength of the guide part is achieved by the design embodiment of the guide part as a bar element. An eccentrically acting expansion force can be easily absorbed and a deflecting movement of the spring body that is radial to the actually effective spring force can be intercepted. The bar element in one embodiment can be configured as a hollow member of which the external diameter is smaller than the internal diameter of the expander spring preferably configured as a coil spring.

The guide part and the expander spring are preferably disposed in a clearance of the retainer bracket so as to be movable at least in the effective direction, or longitudinal direction, of the expander spring, respectively. The clearance within the retainer bracket is in particular adapted to the dimensions of the guide part and of the expander spring. The guide part and the expander spring, which by way of the spring body thereof preferably surrounds the guide part, in the operating state of the disc brake are disposed at the level of the retainer bracket in such a manner that the guide part in terms of the movement thereof is restricted in the direction of the longitudinal axis thereof.

The ends of the clearance of the retainer bracket preferably configure in each case detents for the movement of the movably mounted guide part. The longitudinal direction of the expander spring is presently to be understood to mean a direction of an axis which runs substantially parallel to the expansion force generated by the expander spring. Moreover, the longitudinal axis of the guide part also runs substantially parallel to the acting expansion force of the expander spring.

According to one preferred embodiment, the guide part has at least one guide mandrel which is disposed on the retainer bracket and extends in a clearance configured on the retainer bracket. In one preferred embodiment, exactly one guide mandrel is provided as a guide part, said guide mandrel running in particular parallel to the rotation axis of the brake disc. Moreover, the guide mandrel extends from an end region of the clearance in the direction of the opposite end region of the clearance on the retainer bracket. The one guide mandrel is preferably connected to the retainer bracket on only one side. The free end of the guide mandrel preferably terminates at a spacing of a few millimeters from the proximal end region of the clearance. A potential design embodiment of a loss prevention device for the expander spring is configured by way of the guide part disposed on the retainer bracket.

In one further preferred embodiment, the guide mandrel is a first guide mandrel, and the guide part in addition to the first guide mandrel has a second guide mandrel, wherein the first guide mandrel and the second guide mandrel extend toward one another from opposite ends of the retainer bracket. The axes of the first and of the second guide mandrel are preferably disposed so as to be mutually coaxial. The guide part is preferably formed from two portions by way of which at least the end portions of the expander spring are in each case received and guided in portions, said expander spring acting in particular on the retainer springs.

In one embodiment of the present disclosure, it is provided that the expander spring by way of the end portions thereof acts directly on the brake pads, or the pad carriers of the brake pads, respectively, instead of acting on the retainer springs.

According to one preferred embodiment, the first guide mandrel and the second guide mandrel are configured with dissimilar lengths. The assembling of the expander spring on the guide part of the disc brake is in particular simplified as a result of the guide mandrels being designed with dissimilar lengths. As a result of the guide mandrels being embodied with dissimilar lengths, the spring body of the expander spring has to be compressed only by a fraction of its overall length when being assembled, so that in particular the second end portion of the expander spring to be assembled can be operatively connected to the shorter guide mandrel.

According to one refinement of the disc brake according to the present disclosure, at least one end of the expander spring is assigned a slide which is configured so as to be movable along the guide part and preferably covers the spacing between the first guide mandrel and the second guide mandrel. With the aid of the slide, which in one design embodiment is configured as a sleeve member and is adapted to the dimensions of the expander spring, kinking of the expander spring at the ends thereof is avoided.

The slide is preferably specified for coupling the expander spring and the retainer spring to one another. In other words, the slide functions as a coupling part between the two aforementioned elements, wherein the slide has a predefined minimum length in order to counteract any jamming on the retainer bracket.

Each end of the expander spring is preferably assigned such a slide, wherein the expander spring, which is preferably configured as a coil spring, by way of the ends thereof bears on the slides in a fully circumferential manner.

In one preferred design embodiment having two mutually facing guide mandrels which lie opposite one another so as to be spaced apart, the slide is preferably specified for covering the spacing between the guide mandrels. In particular in conjunction with the design embodiment in which the first guide mandrel is movable in a reciprocating manner between an operating position and an assembling position, the first guide mandrel can be prevented from unintentionally deflecting and thus be kept in the operating position thereof by the slide. In this way, the reliability of the guide part configured from the first and the second guide mandrel is moreover enhanced.

In one design embodiment of the disc brake, in which a slot is configured by way of the spacing between the first guide mandrel and the second guide mandrel, the slot is disposed on that side of the retainer bracket that is assigned to the brake pad on the disc brake that is not adjustable relative to the brake caliper. In this way, the slide that covers the slot preferably does not move relative to the brake caliper.

According to one preferred refinement of the disc brake according to the invention, the first guide mandrel and the second guide mandrel for inserting the expander spring terminate at a mutual spacing, the spacing between the ends of the first and the second guide mandrel preferably being smaller than the block length of the expander spring. The spacing between the ends and the introduction gap resulting therefrom in terms of size are chosen in such a manner that an expander spring, preferably configured as a coil spring, by one of the ends thereof can be pushed onto one of the guide mandrels by way of the introduction gap. Thereafter, the expander spring is compressed until the opposite end of the spring body can be moved into the introduction gap between the ends of the first and the second guide mandrel, so as to then move the expander spring over the shorter one of the guide mandrels. The spacing is smaller than the block length of the expander spring so that the latter in the maximum compressed state thereof cannot unintentionally move out of the introduction gap between the ends of the first and the second guide mandrel. The spacing between the ends of the spring in one preferred embodiment corresponds to less than approximately one quarter of the overall length of the first and the second guide mandrel.

According to one further preferred embodiment, the disc brake has a mating part which for connecting the ends of the first and the second guide mandrel has mountings for fastening to the first and the second guide mandrel. Kinking of the expander spring in the region between the ends of the first and the second guide mandrel of the guide part is counteracted by way of the mating part that is insertable between the free ends of the first and the second guide mandrel. The mating part is preferably aligned so as to be coaxial with the guide mandrels and bears in each case on the free ends of the first and the second guide mandrel. Moreover, the mating part is in each case equipped with mountings that engage across portions of the first and the second guide mandrel. The mating part is fastened to the guide mandrels by way of the mountings.

In one embodiment of the invention, the first and the second guide mandrel can be configured with identical lengths when such a mating part is used. For example, the mating part can be a sheet-metal part which is bent so as to form a sleeve member, the mountings of the latter being externally fastened to a portion of the first and the second guide mandrel.

A preferred refinement of the invention provides that at least the first or the second guide mandrel is movable in a reciprocating manner between an operating position and an assembling position for assembling the spring element. The assembling of the expander spring on the disc brake is simplified in this way. Instead of providing a sufficiently large spacing between the preferably mutually coaxial guide mandrels in order to operatively connect the expander spring to the guide part, the spacing in this embodiment can define a slot which may be only a few millimeters (single digits) in size, for example. The guide mandrel is in particular configured so as to be movable when the guide part for the expander spring has only one guide mandrel.

According to one preferred embodiment, at least one portion of the movable guide mandrel is able to be plastically or elastically deformed. In the case of a portion of the guide mandrel configured so as to be able to be plastically deformed, the movable guide mandrel is transferred from the operating position to the assembling position and remains in the assembly position without the orientation being changed. In order for the guide mandrel to be returned to the operating position, said guide mandrel is to be in particular bent back from the assembling position to the operating position in a targeted manner, a plastic deformation of at least one portion of the guide part again taking place.

In the case of a portion of the guide mandrel configured so as to be able to be elastically deformed, which represents an alternative design embodiment of the guide part, the guide mandrel is moved out of the operating position by applying a disengagement force transversely to the longitudinal extent of said guide mandrel, and has to be held in the assembling position by maintaining the disengagement force while the expander spring is pushed onto the guide mandrel. In the absence of the disengagement force, the elastically deformable guide mandrel returns to the operating position in a self-acting manner.

One refinement of the disc brake furthermore provides a cover which is specified for at least in portions covering the expander spring on the retainer bracket. With the aid of the cover, which in the assembled state of the expander spring is preferably at least in portions disposed directly above the expander spring, a portion of the expander spring that extends between the ends of the guide part is held in position by the cover disposed thereabove. Kinking of the expander spring, which is in particular unevenly stressed, transversely to the expansion force generated by the expander spring is in particular avoided. Moreover, an alternative design embodiment of a loss prevention device is achieved by the cover. Moreover, the protection of the expander spring in relation to external environmental influences such as dirt or moisture is effected with the aid of the cover, the function of the expander spring being improved in the long term as a result.

The cover is preferably fastened to the retainer bracket by suitable fastening means such as, for example, one or a plurality of fastening screws. The dimensions of the cover are chosen in such a manner that, besides the expander spring and the guide part, the clearance on the retainer bracket is preferably also covered, parts of the guide part, in particular the first and the second guide mandrel, extending within said clearance and the expander spring being disposed within the latter.

According to one preferred embodiment of the disc brake, the cover is part of a protective cap that shields the brake caliper on the upper side thereof. The protective cap is preferably specified for almost completely covering the upper side of the brake caliper. In this way, environmental influences are not only kept away from the expander spring and the guide part receiving the expander spring, but the effect of said environmental influences on the entire brake caliper, including the brake pads that are movably guided on the brake caliper, is also reduced. The cover for the expander spring is preferably integrally integrated in the protective cap.

In a further aspect, the invention relates to a kit for a brake caliper of a disc brake according to one of the preferred embodiments described above.

The invention achieves the object described at the outset in that the kit has a retainer bracket, an expander spring, the ends of the latter being specified for being brought to bear in each case directly on a retainer spring, and a guide part which at least in portions receives the expander spring in the longitudinal direction. In one preferred embodiment, the guide part that receives the expander spring is configured separately from the retainer bracket, i.e. as an individual part. The guide part is configured as a bar element and is at least in portions surrounded by the expander spring.

In an alternative embodiment, the guide part is configured so as to be integral to the retainer bracket and has at least one first guide mandrel, the expander spring extending along the latter. A potential design embodiment of a loss prevention device for the expander spring on the disc brake according to the invention is implemented by way of the integral design embodiment of the guide part on the retainer bracket.

The advantages and preferred embodiments described in the context of the disc brakes according to the invention of the first and the second aspect are simultaneously advantages and preferred embodiments of the kit according to the further aspect, and vice versa, wherein the kit can and is to be used in particular as a replacement part in conjunction with a repair or maintenance measure on a disc brake according to the invention of a commercial vehicle.

The features of the invention disclosed in the description, in the drawings as well as in the claims can be relevant to the refinement of the invention individually as well as in any arbitrary combination with one another, unless said features are technically contradictory.

BRIEF DESCRIPTION OF THE DRAWINGS

The invention will be described in more detail hereunder by way of various exemplary embodiments with reference to the appended figures, in which.

DETAILED DESCRIPTION

Figure 1:
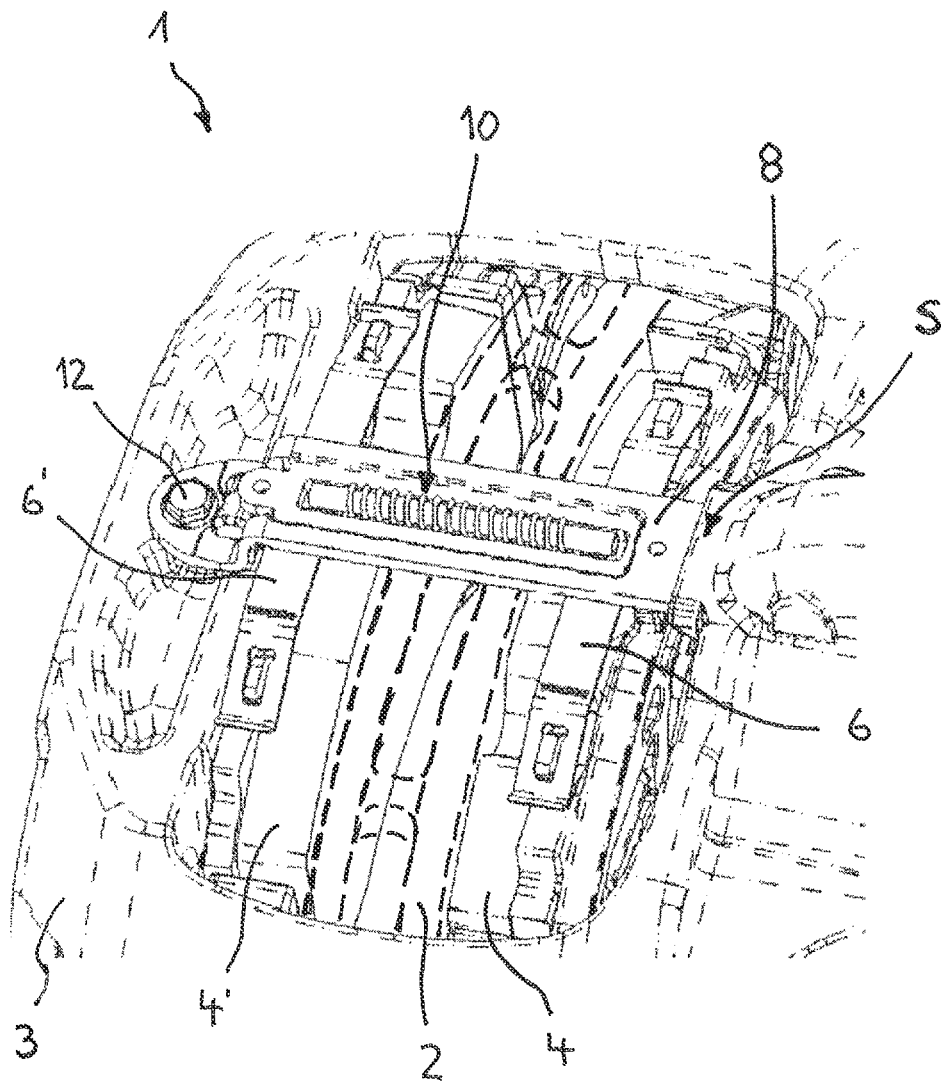
FIG. 1 shows a first embodiment of a disc brake according to the present disclosure.

FIG. 1 shows a disc brake 1 for a commercial vehicle, having a brake disc 2 and a brake caliper 3. One pair of brake pads 4, 4' on the brake caliper 3 are movably guided on both sides of the brake disc 2, said brake pads 4, 4' upon activation of the brake applying a brake force on brake faces of the brake disc 2. While the brake is being activated, the brake pads 4, 4' are converged.

The disc brake 1 furthermore comprises retainer springs 6, 6', wherein one retainer spring 6, 6' is in each case disposed on one brake pad 4, 4'. The disc brake 1 moreover comprises a retainer bracket 8 which is specified for pre-tensioning the retainer springs 6, 6' in relation to the respectively assigned brake pad 4, 4', in particular in the radial direction R (FIG. 2) in terms of a rotation axis, not illustrated in more detail, of the brake disc 2.

Furthermore provided on the disc brake 1, in particular the retainer bracket 8, is an expander spring 10 which is specified for applying an expansion force between the brake pads 4, 4' and diverging the brake pads upon activation of the brakes. The expander spring 10 preferably acts in such a manner that the contact between the brake faces of the brake disc 2 and the brake pads 4, 4' is cancelled.

The retainer bracket 8 in the present embodiment at one end is held in a plug-in receptacle S and at the opposite end is secured on the brake caliper 3 by a fastening screw 12.

Figure 2:
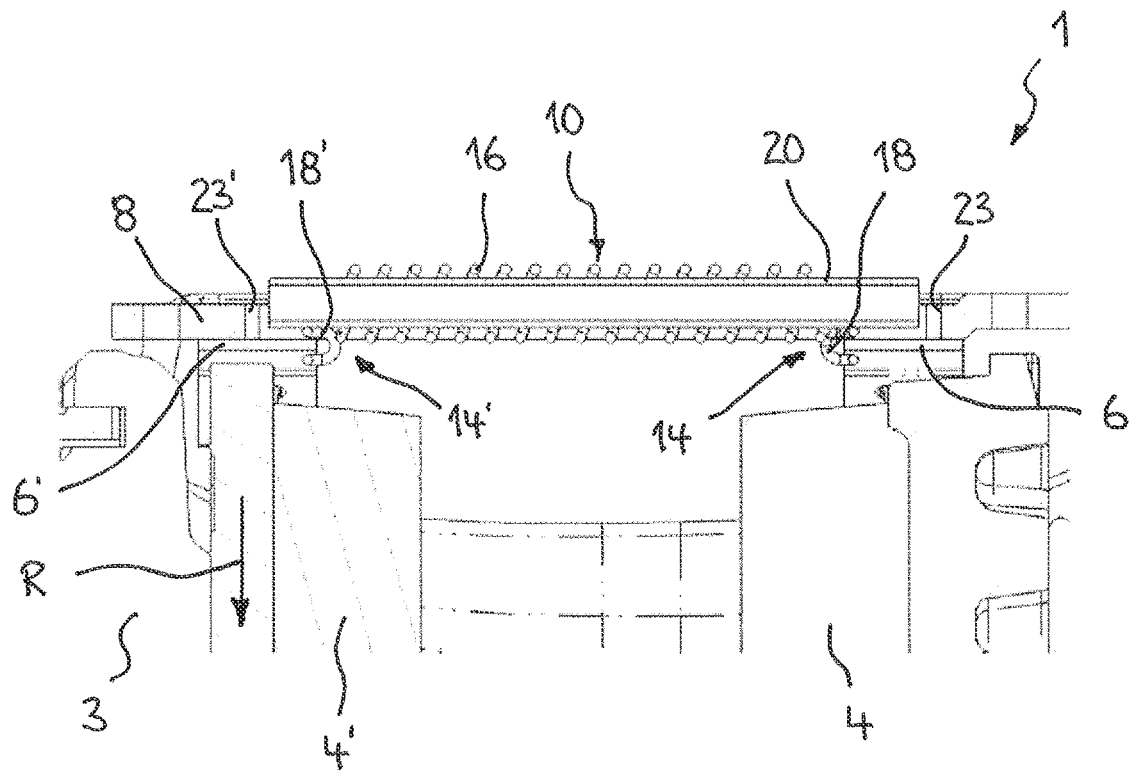
FIG. 2 shows a sectional illustration of the disc brake of FIG. 1.

As is apparent from FIG. 2, the expander spring 10 has two ends 14, 14' which bear in each case directly on one of the retainer springs 6, 6' and transmit the expansion force generated by the spring body 16 of the expander spring 10 to the retainer springs 6, 6' without the intervention of any potential coupling means.

For transmitting the expansion force generated by the spring body 16 of the expander spring 10, the expander spring on each end 14, 14' thereof has a holding portion 18, 18', wherein the holding portions 18, 18' in each case contact an assigned retainer spring 6, 6'. In the embodiment shown, each holding portion 18, 18' is integrally molded on an end portion of the expander spring 10. Moreover, the embodiment shown engages laterally across the retainer spring 6, 6' at least in portions on the upper and the lower side of the latter.

The disc brake 1 furthermore has a guide part 20 by way of which the expander spring 10 at least in portions is guided in the effective direction of the expansion force. In the embodiment shown, the holding portions 18, 18' are disposed outside the center of mass of the expander spring 10. The expansion force generated by the spring body 16 thus acts eccentrically on the retainer springs 6, 6' so that the expander spring in the longitudinal orientation thereof is held transversely to the effective direction of the expansion force by way of the guide part 20.

Figure 3:
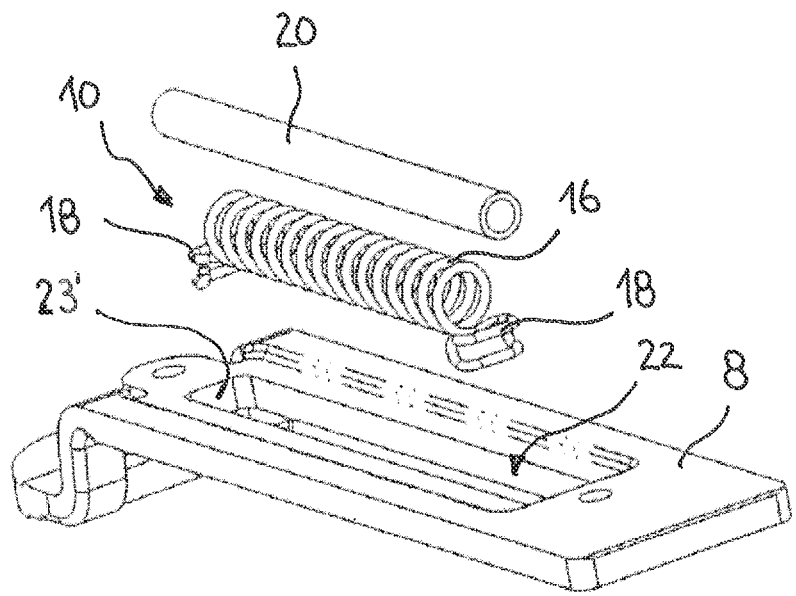
FIG. 3 shows a perspective exploded illustration of an embodiment according to the invention of a retainer bracket, an expander spring, and a guide part according to FIGS. 1 and 2.

FIG. 3 shows a perspective exploded illustration of the retainer bracket 8, the expander spring 10 and a guide part 20. All three components are configured separately from one another and in the present embodiment represent individual components of the disc brake 1 according to the present disclosure.

The expander spring 10 in the embodiment shown is configured as a coil spring. The guide part 20 is a bar element which is at least partially surrounded, in particular wrapped, by the expander spring 10. The guide part 20 and the expander spring 10 are received so as to be movable in a clearance 22 of the retainer bracket 8. The guide part 20 by way of the longitudinal axis thereof is disposed so as to be offset from the retainer bracket 8. The opposite ends 23, 23' of the clearance 22, the latter having a rectangular basic shape, form in each case one detent for the movement of the guide part 20.

Figure 4:
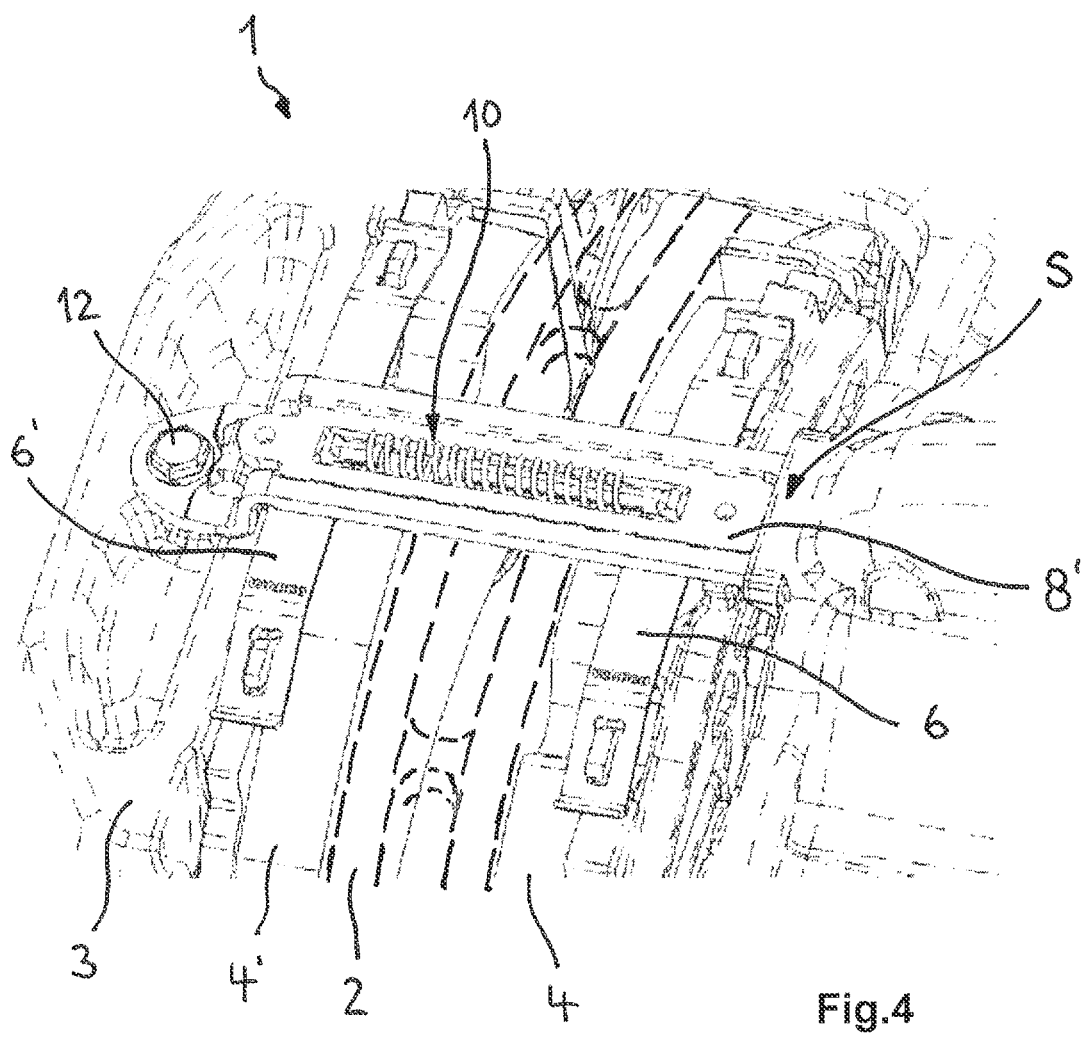
FIG. 4 shows a perspective view of a further embodiment of a disc brake according to the present disclosure.

FIG. 4 shows a further embodiment according to the invention of a disc brake 1. In terms of the fundamental design embodiment and functional mode of this exemplary embodiment reference is made to the explanations pertaining to the embodiment of a disc brake according to the present disclosure shown in FIG. 1.

The expander spring 10 shown in this embodiment also bears directly on the retainer springs 6, 6' of the disc brake 1. The disc brake 1 comprises a retainer bracket 8' on which is provided a guide part 20' which, as opposed to the first embodiment, is configured so as to be integral to the retainer bracket 8'. Provided on the retainer bracket 8' is a clearance 22', the guide part being disposed within the latter so as to extend parallel to the longitudinal direction of the clearance 22'.

In one embodiment, the guide part 20' has a first guide mandrel 24 and a second guide mandrel 26 which extend toward one another from opposite ends 23, 23' of the clearance 22'. The expander spring 10 is received by the first guide mandrel 24 and the second guide mandrel 26. The first and the second guide mandrel 24, 26 extend along a portion within the expander spring 10. Besides a guide, a loss prevention device for the expander spring 10 is present by way of the guide part 20' which is configured so as to be integral to the retainer bracket 8'. In this way, the expander spring 10 is permanently held on the brake 1 even in the absence of the expansion force.

Figure 5:
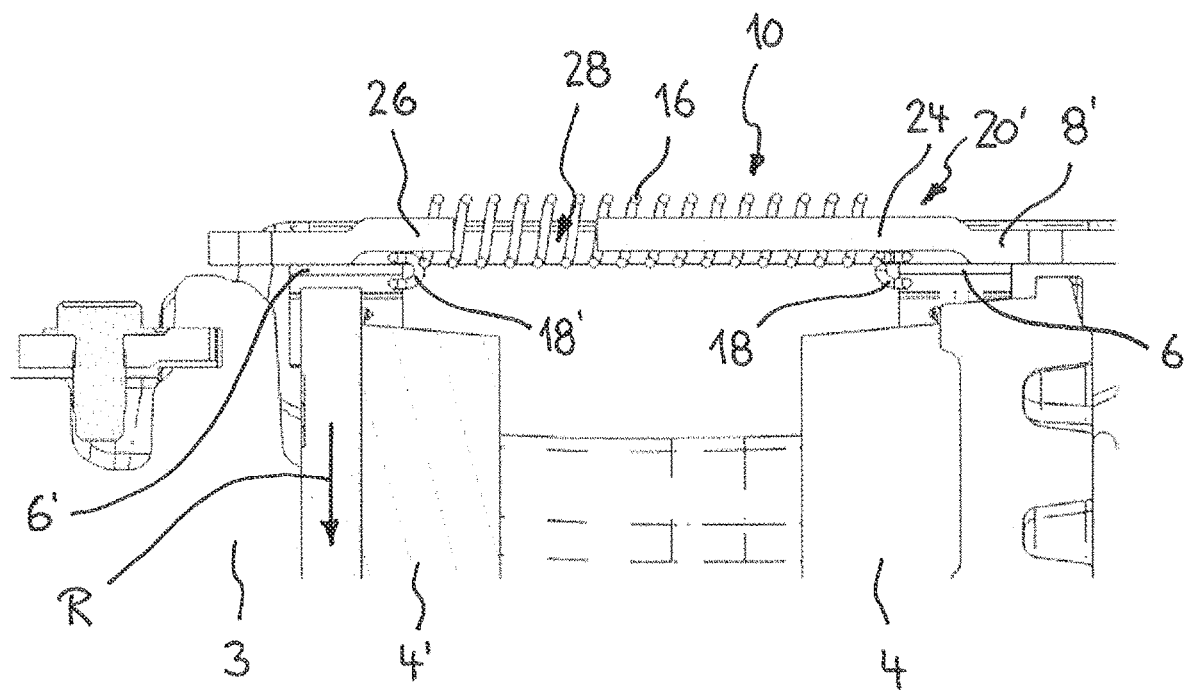
FIG. 5 shows a sectional illustration of the disc brake of FIG. 4.
Figure 6:
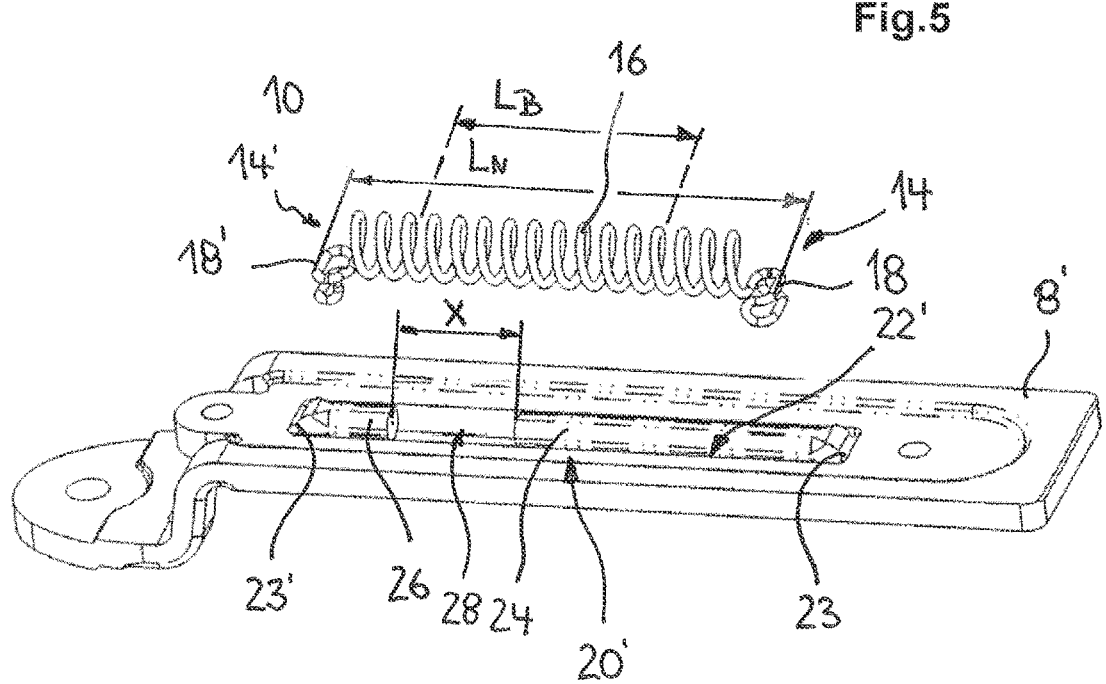
FIG. 6 shows a perspective exploded illustration of a retainer bracket having a guide part configured thereon and an expander spring according to FIGS. 4 and 5.

As is apparent from FIGS. 5 and 6, the first guide mandrel 24 and the second guide mandrel 26 terminate at a predefined mutual spacing X and define an introduction gap 28 for the expander spring 10. The introduction gap 28 makes it possible for the expander spring by way of one end to be pushed over the first guide mandrel 24, and the opposite end of the expander spring 10 to then be pushed onto the second guide mandrel 26. Moreover, the longitudinal axes of the guide mandrels 24, 26 have an offset from the plane of the retainer bracket 8'.

As is furthermore apparent from FIGS. 5 and 6, the first and the second guide mandrel 24, 26 are of dissimilar lengths. In this way, the introduction gap 28 is disposed so as to be offset from the ends 23, 23' of the clearance 22'. The expander spring 10, as a result of the eccentric engagement of the holding portions 18, 18' thereof, is again eccentrically stressed. The kinking of the expander spring 10 is presently counteracted by the first and the second guide mandrel 24, 26 of the guide part 20.

FIG. 6 highlights that the expander spring 10 has a normal length $L_N$ at which the expander spring 10 is not compressed. The expander spring 10 furthermore has a block length $L_B$ which corresponds to the length of the expander spring 10 in the maximum compressed state of the latter. The spacing X between the ends of the first and the second guide mandrel 24, 26 is smaller than the block length $L_B$ of the expander spring 10 so that the latter, even when compressed to the maximum, cannot move out of the introduction gap 28.

Figure 7:
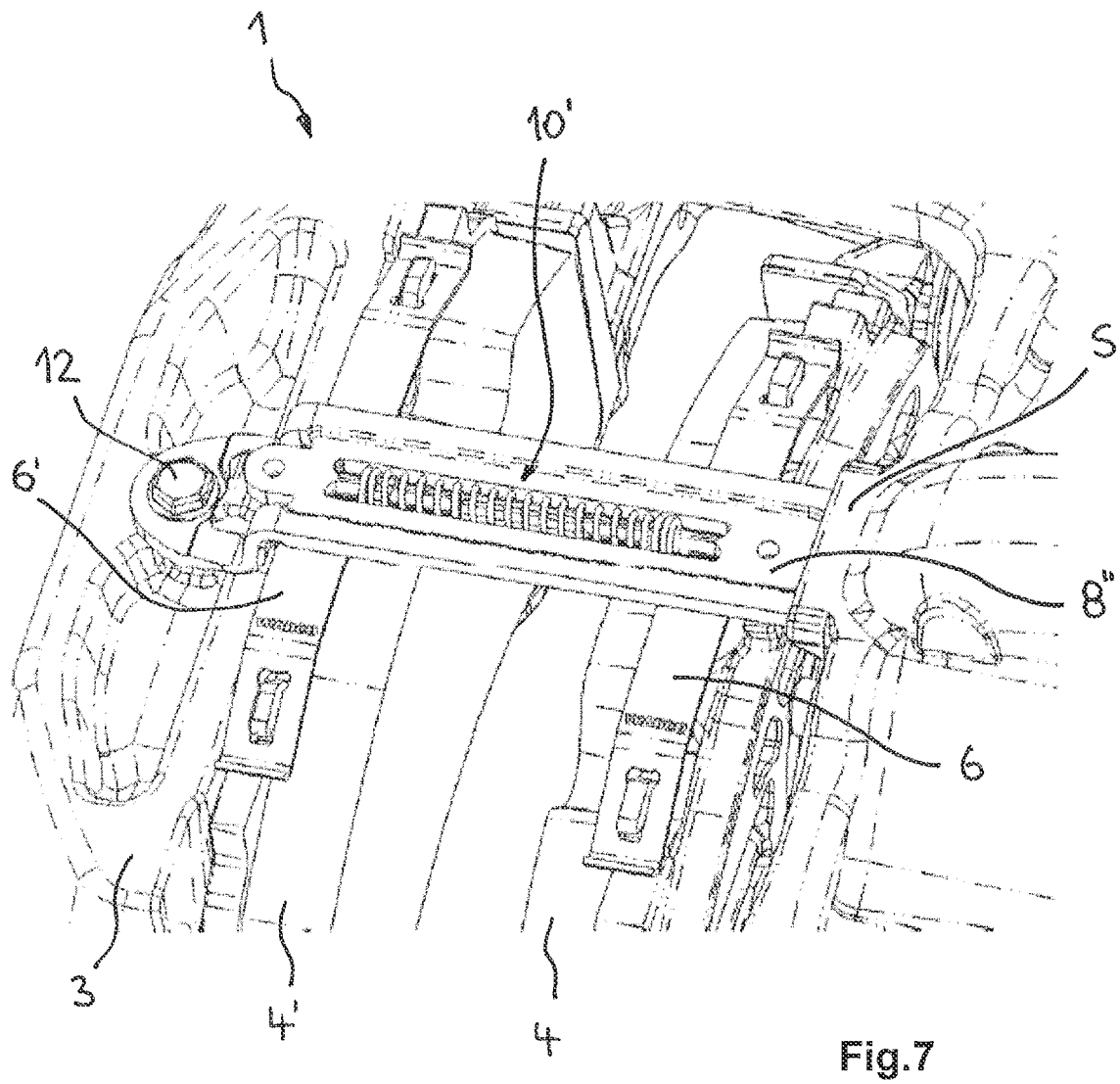
FIG. 7 shows a perspective view of a further embodiment of a disc brake according to the present disclosure.

FIG. 7 shows a further embodiment of a disc brake 1 according to the invention, reference in terms of the fundamental design embodiment and function thereof being made to the explanations pertaining to FIG. 1. Disposed on the brake caliper 3 is again a retainer bracket 8" again having a guide part 20" configured so as to be integral to the retainer bracket 8". The guide part 20' in the clearance 22' has a first guide mandrel 24' and a second guide mandrel 26'.

Figure 8:
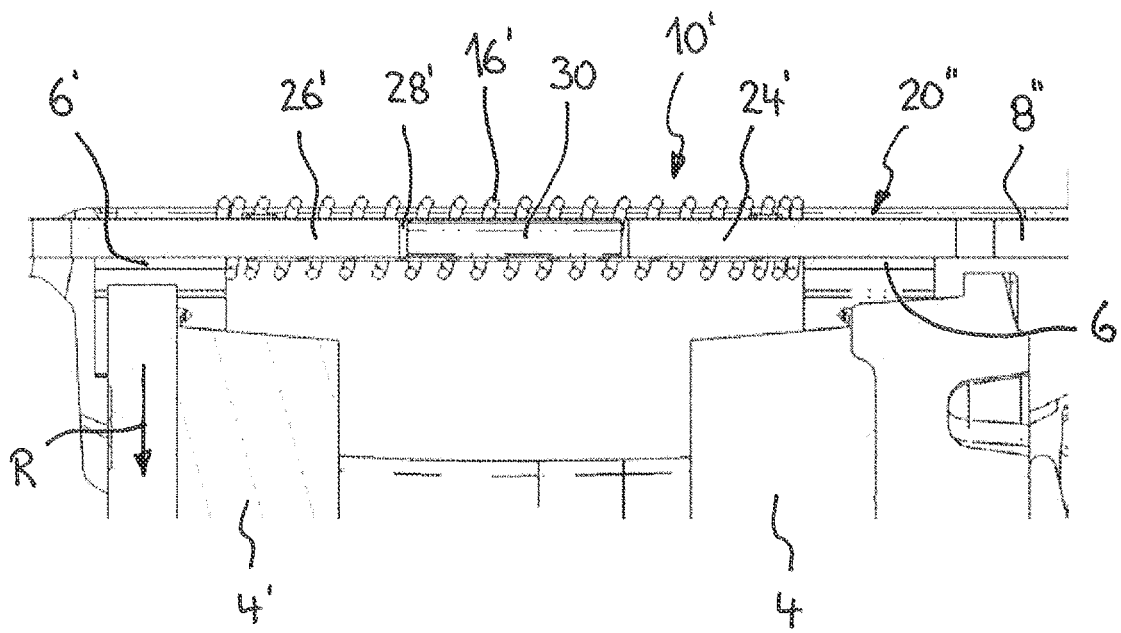
FIG. 8 shows a sectional illustration of the disc brake of FIG. 7.
Figure 9:
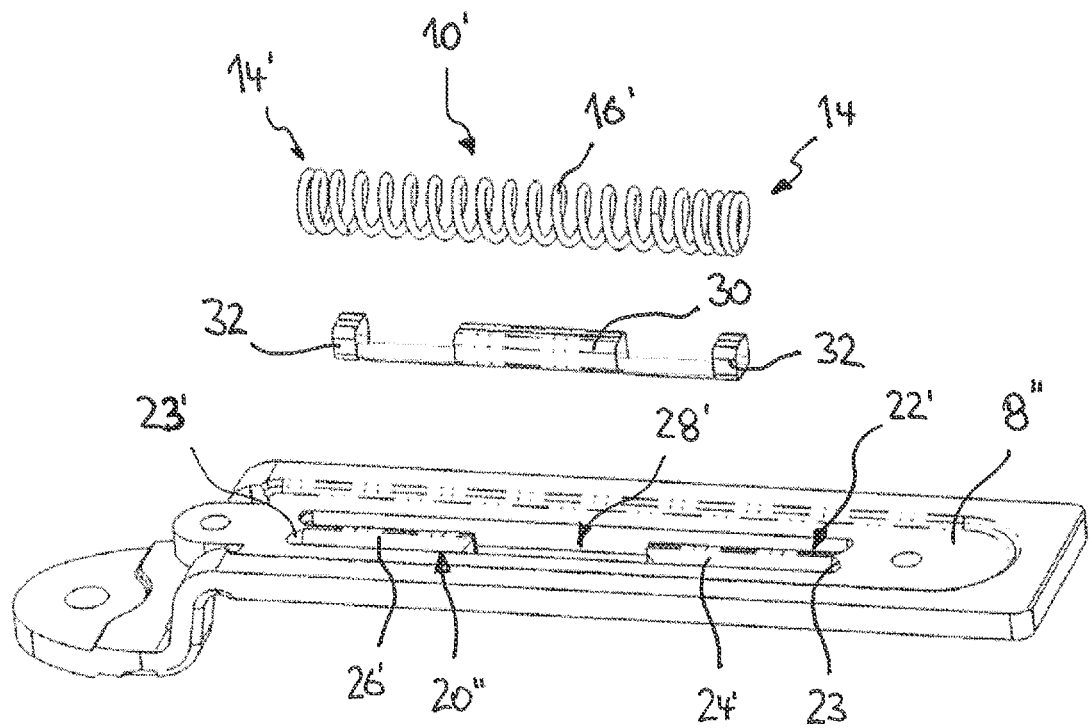
FIG. 9 shows a perspective exploded illustration of a retainer bracket according to the invention, having an expander spring to be inserted therein, and a mating part.

As is highlighted by FIGS. 8 and 9, the first guide mandrel 24' and the second guide mandrel 26' are of identical lengths, wherein a mating part 30, which fills an introduction gap 28' present between the ends of the guide mandrels 24', 26', is inserted between the free ends of the first and the second guide mandrel 24', 26'.

An expander spring 10', the ends 14, 14' thereof, as opposed to the previously described embodiment, engaging on the retainer springs without holding portions configured on the spring body 16', is received on the retainer bracket and the guide part 20" of the latter. As opposed to the previous embodiment, the guide part 20" by way of the guide mandrels 24', 26' thereof, runs in the clearance 22' so as to be in one plane with the retainer bracket 8". A loss prevention device for the expander spring 10' on the disc brake according to the invention is also implemented by way of the guide part 20" which is configured so as to be integral to the retainer bracket 8".

The mating part 30 which is disposed between the ends and fills the introduction gap 28' is preferably produced from a bent sheet-metal part which at the ends thereof has in each case mountings 32 for fastening to the first and the second guide mandrel 24', 26'. Kinking of the eccentrically compressed expander spring 10' is more intensely counteracted by way of the mating part 30.

Figure 10:
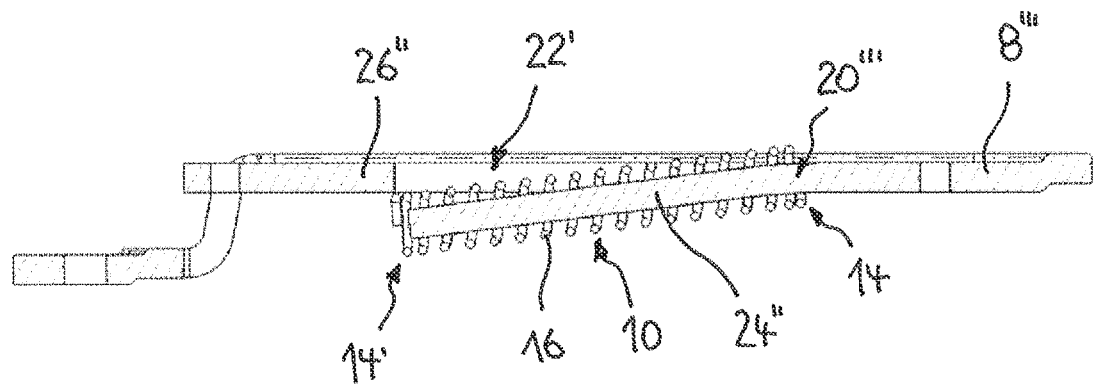
FIGS. 10 and 11 show views of a further embodiment of a retainer bracket according to the invention, having a guide part configured thereon, and an expander spring to be assembled, as a sectional illustration.
Figure 11:
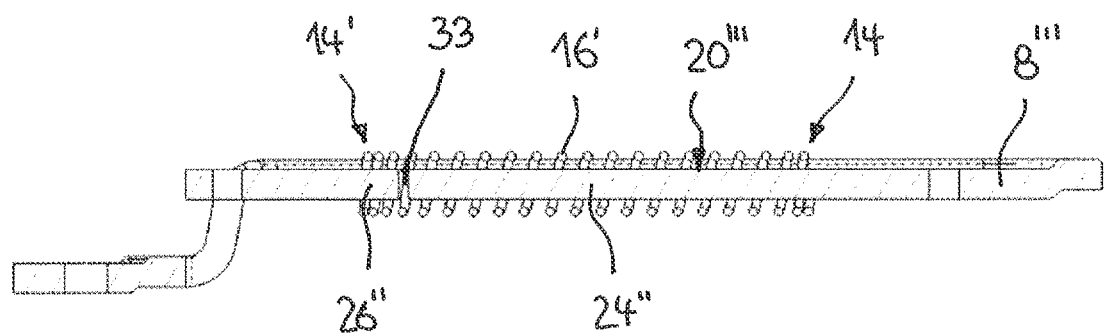

FIGS. 10 and 11 show a further embodiment of a retainer bracket 8''' according to the invention. The retainer bracket 8''' has a guide part 20''' which runs in a clearance 22' and is configured from at least one first guide mandrel 24'' and one second guide mandrel 26''. As opposed to the previous design embodiments, the guide mandrels 24'', 26'' terminate at a minor mutual spacing, the latter defining a slot 33 of a few millimeters.

In order to be able to assemble an expander spring 10' on the retainer bracket according to the invention, at least one of the guide mandrels 24'', 26'', presently the first guide mandrel 24'', is able to be moved in a reciprocating manner between an operating position, shown in FIG. 11, and an assembly position for assembling the expander spring, shown in FIG. 10. To this end, at least one portion of the first guide mandrel 24'' is configured so as to be able to be plastically or elastically deformed. For assembling the expander spring 10, the first guide mandrel 24'' is moved out of the plane of the retainer bracket 8''' by a disengagement force which acts transversely to the longitudinal extent of the guide mandrel 24''. After pushing on the end 14 of the expander spring 10' and compressing the expander spring 10', the first guide mandrel 24'' is moved back into the plane of the retainer bracket 8''' and the other end 14 is moved over the second guide mandrel 26''.

Figure 12:
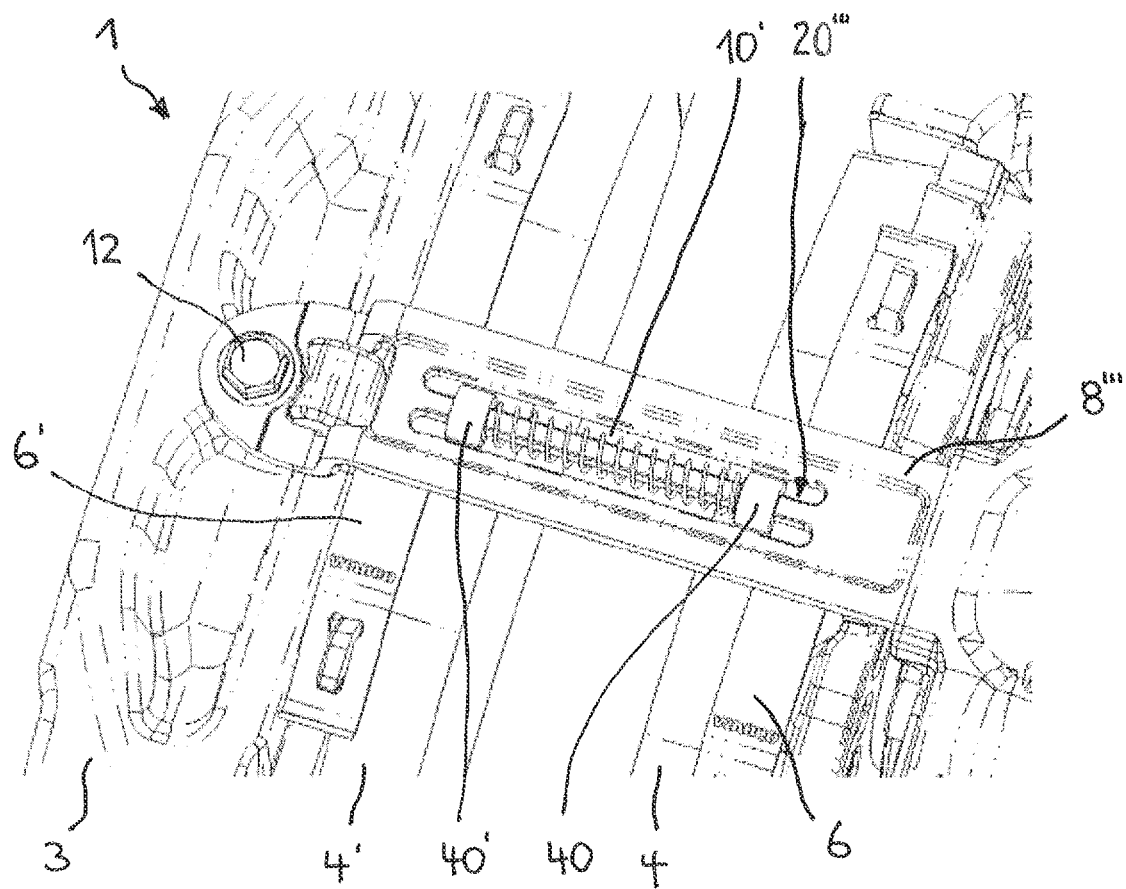
FIGS. 12 and 13 show views of a further embodiment of a retainer bracket according to the invention, having an expander spring assembled on the guide part, and slides, in a perspective view and a sectional illustration.

A further embodiment of a disc brake 1 according to the invention, which relates to a refinement of the embodiment of the retainer bracket 8''' shown in FIGS. 10 and 11, is shown in FIG. 12. In terms of the fundamental design embodiment and function of this embodiment, reference is made to the explanations above pertaining to FIG. 1.

Figure 13:
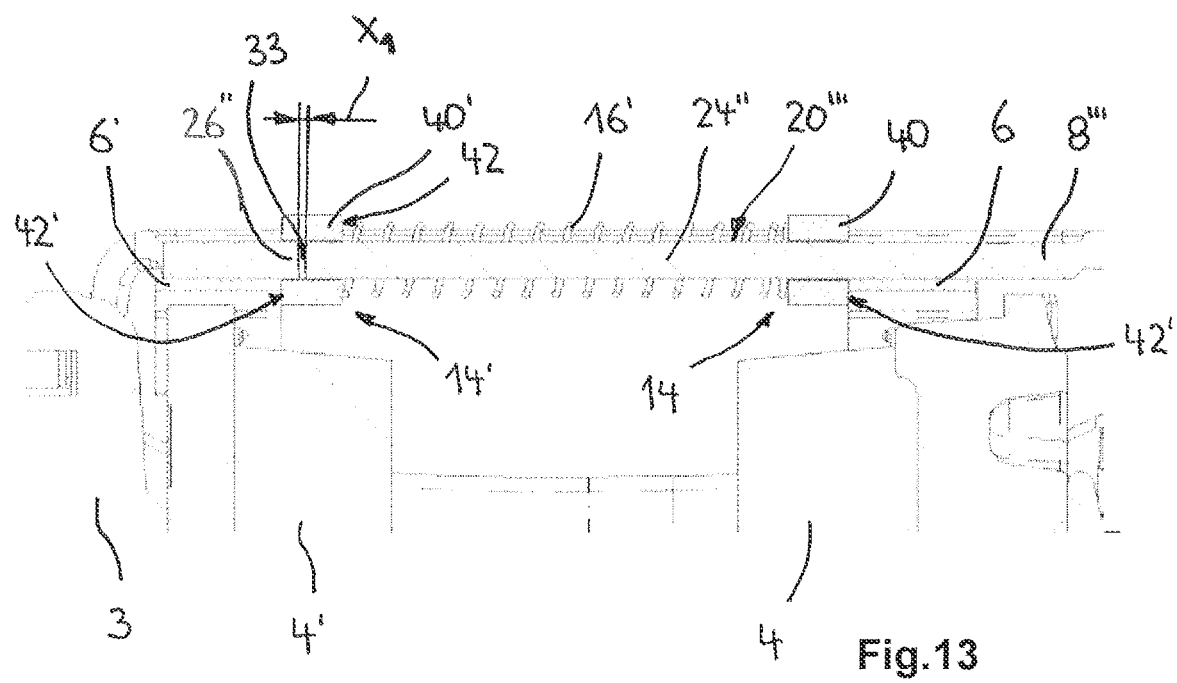

Instead of an expander spring 10' that bears directly on a respective retainer spring 6, 6', the ends 14, 14' of the expander spring 10' are in each case assigned one slide 40, 40'. The slides 40, 40', which in the present embodiment are configured as a type of sleeve member and are guided along the guide part 20''', serve as a connecting means between the expander spring 10' and the retainer springs 6, 6' on the brake pads 4, 4'. An evenly distributed effect of force across the circumference of the expander spring 10' configured as a coil spring is achieved by way of the slides 40, 40'. The ends 14, 14' of the expander spring 10' bear in a fully circumferential manner on an end side 42 of the slide 40 (FIG. 13). The opposite end side 42' bears on the respective retainer spring 6, 6'.

As is furthermore apparent from FIG. 13, each slide 40, 40' has a minimum length which counteracts any jamming or canting by virtue of friction along the guide part 20''. The design embodiment shown in FIG. 13 also has a first guide mandrel 24'' and a second guide mandrel 26'' of dissimilar lengths. At least the first guide mandrel 24'' is configured so as to be able to be plastically or elastically deformed. The first guide mandrel 24'' and the second guide mandrel 26'' terminate at a minor mutual spacing $X_1$, wherein the slot 33 formed by the spacing is positioned below the slide 40', as is shown in FIG. 13. In the operating position of the first guide mandrel 24', the slide 40' secures the guide mandrel 24'' in relation to a movement out of the axis of the guide part 20''.

The slot 33 between the guide mandrels 24'' and 26'' is disposed on that side of the retainer bracket 8''' that is assigned to the retainer spring 6' and thus to the brake pad 4' which is immovable relative to the brake caliper 3. The guide part 20''' in the present embodiment has a rectangular cross section.

As a result of the guide mandrels that terminate at a minor mutual spacing $X_1$ and of the slide 40' that covers the slot 33 between the guide mandrels 24'', 26'', a design embodiment of a loss prevention device is implemented.

Figure 14:
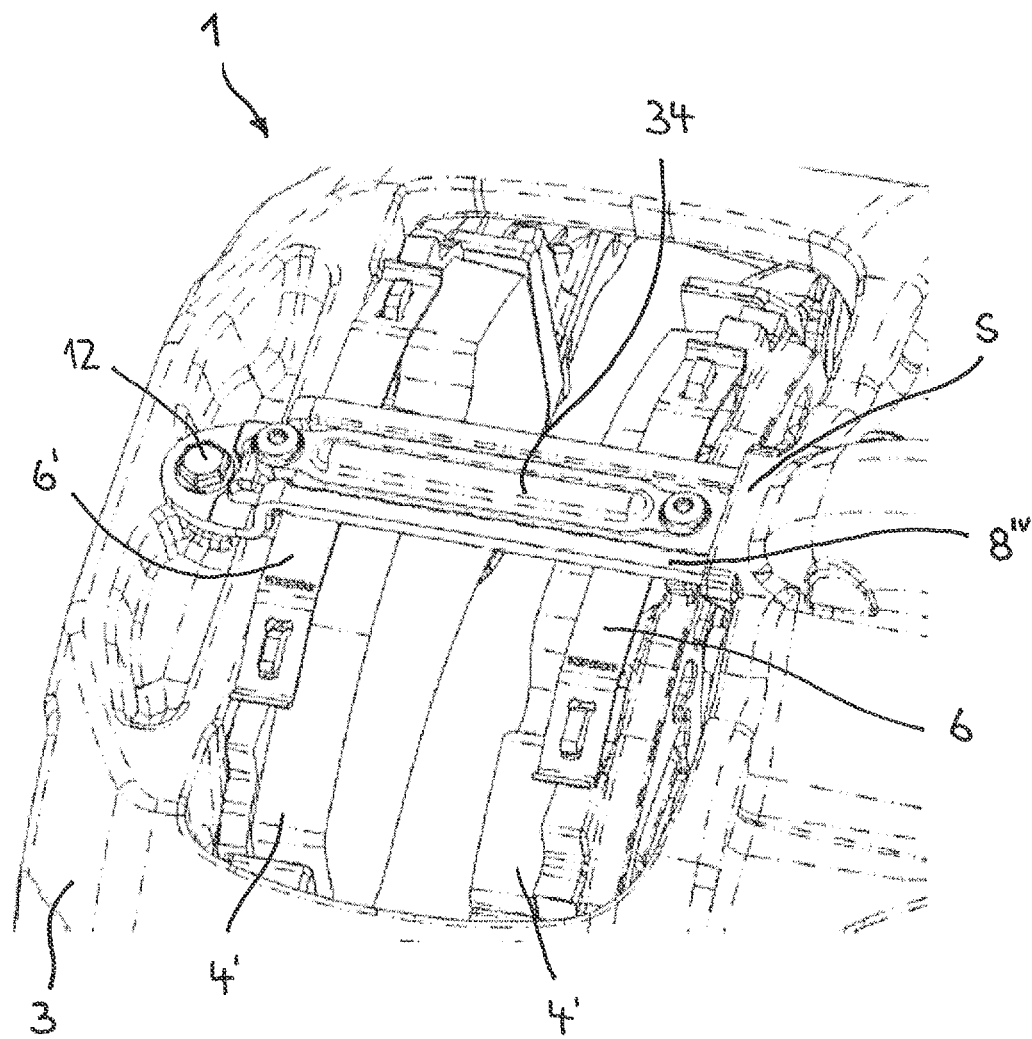
FIG. 14 shows a perspective view of a further embodiment according to the present disclosure of a disc brake.

FIG. 14 shows a further embodiment of a disc brake 1 according to the invention. In terms of the specific design embodiment and functional mode reference is again made to the explanations pertaining to the embodiment shown in FIG. 1.

Figure 15:
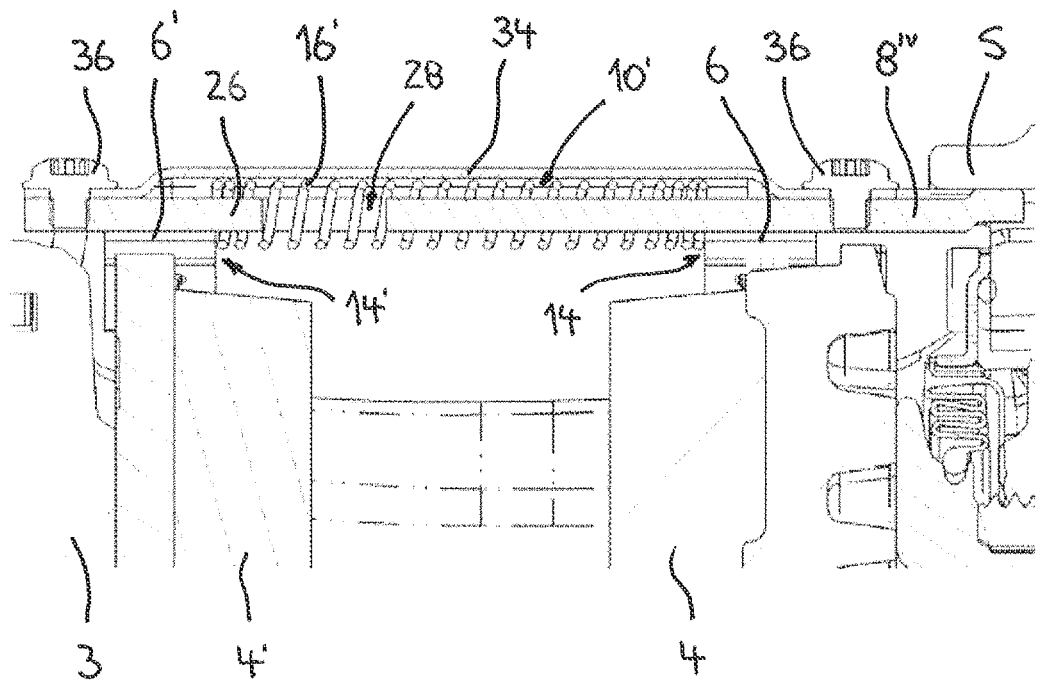
FIG. 15 shows a sectional illustration of the disc brake of FIG. 14.
Figure 16:
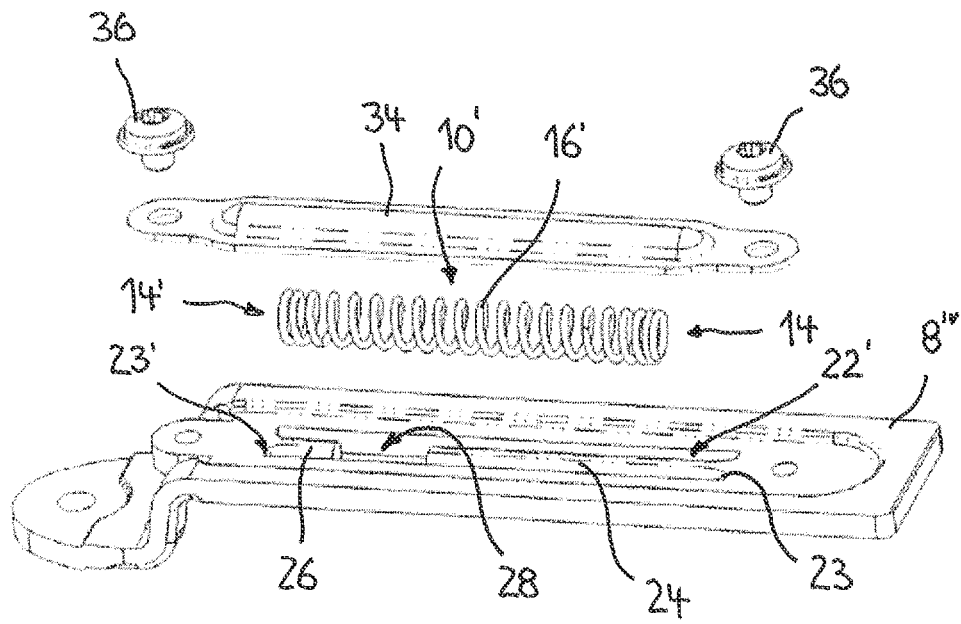
FIG. 16 shows a perspective exploded illustration of a further exemplary embodiment of a retainer bracket having a guide part configured thereon, an expander spring, and a cover that is able to be assembled on the retainer bracket.

As is apparent from FIGS. 14 to 16, the disc brake 1 has a retainer bracket $8^{IV}$ on which a cover 34 for the expander spring is additionally provided, the expander spring 10' received on the retainer bracket $8^{IV}$ being at least in portions covered by way of said cover 34. The expander spring 10 by way of the ends thereof engages directly on one of the retainer springs 6, 6'. The guide part 20' that guides the expander spring 10' again has a first guide mandrel 24 and a second guide mandrel 26 which again run in a plane with the retainer bracket $8^{IV}$ and extend toward one another from opposite ends 23, 23' of the clearance 22'.

The first and the second guide mandrel 24, 26 are of dissimilar lengths and terminate at a predefined mutual spacing, as a result of which an introduction gap 28 for the expander spring 10' is present. In a manner similar to the mating part 30 to be positioned between the ends of the guide mandrels, it is achieved with the aid of the cover 34 that the expander spring 10', despite an expansion force being transmitted eccentrically by the latter, does not kink transversely to the longitudinal direction of said expander spring 10'. The cover 34 is fastened to the retainer bracket $8^{IV}$ by way of corresponding fastening means 36.

Figure 17:
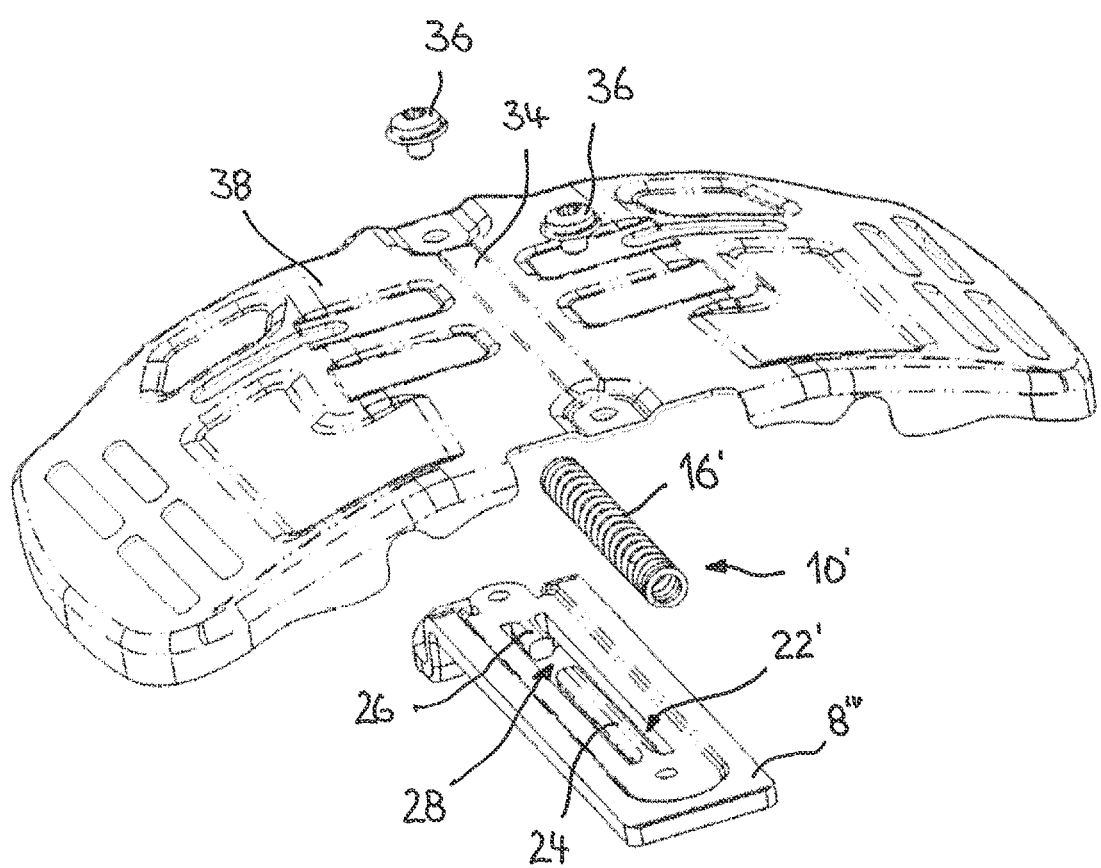
FIG. 17 shows a perspective exploded illustration of the retainer bracket and of the expander spring of FIG. 16, having a protective cap which as an alternative to the cover is to be assembled on the retainer bracket and covers the upper side of the brake caliper.

In an embodiment shown in FIG. 17, the cover 34 is part of a protective cap 36 for the brake caliper 3, wherein the protective cap 36 almost completely covers the upper side of the brake caliper 3. In a manner similar to the cover 34, the protective cap 38 is secured by way of two fastening means 36 that are able to be fastened to the retainer bracket $8^{IV}$.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

LIST OF REFERENCE SIGNS (COMPONENT PART OF THE DESCRIPTION)

1 Disc brake
2 Brake disc
3 Brake caliper
4, 4' Brake pads
6, 6' Retainer spring
8-$8^{IV}$ Retainer bracket
10, 10' Expander spring
12 Fastening screw
14, 14' End
16, 16' Spring body
18, 18' Holding portion
20-20''' Guide part
22, 22' Clearance
23, 23' End of clearance
24, 24', 24'' First guide mandrel 26, 26', 26" Second guide mandrel
28, 28' Introduction gap
30 Mating part
32 Mounting
33 Slot
34 Cover
36 Fastening means
38 Protective cap
40, 40' Slide
42, 42' End side
$L_B$ Block length of the spring
$L_N$ Normal length of the spring
R Radial direction
S Plug-in receptacle
X, $X_1$ Spacing

What is claimed is:

1. A disc brake (1) for a motor vehicle, comprising:
a brake disc (2);
a brake caliper (3);
two brake pads (4, 4') on both sides of the brake disc (2), the brake pads movably guided on the brake caliper (3);
a retainer spring (6, 6') on each brake pad (4, 4');
a retainer bracket ($8\text{-}8^{IV}$) for pre-tensioning the retainer springs (6, 6') in relation to the respective brake pad (4, 4'); and
an expander spring (10, 10') that applies an expansion force in an effective direction between the brake pads (4, 4') and diverging the brake pads (4, 4');
wherein the ends of the expander spring (10, 10') bear in each case directly on one of the retainer springs (6, 6');
a guide part (20-20''') that receives the expander spring (10, 10') and at least partially guides the expander spring in the effective direction of the expansion force;
wherein the guide part (20'-20''') has at least one first guide mandrel (24-24') which is disposed on the retainer bracket ($8'\text{-}8^{IV}$) and extends in a clearance (22') on the retainer bracket ($8'\text{-}8^{IV}$).

2. The disc brake as claimed in claim 1, wherein the expander spring (10, 10') on each end thereof has a holding portion (18, 18') that can be brought in contact with the retainer springs (6, 6').

3. The disc brake as claimed in claim 2, wherein each holding portion (18, 18') is integrally molded in an end portion of the expander spring (10, 10') and encompasses the retainer spring (6, 6') at least partially.

4. The disc brake as claimed in claim 2, wherein the holding portion (18, 18') is disposed outside the center of mass of the expander spring (10, 10').

5. A disc brake (1) for a motor vehicle, comprising:
a brake disc (2);
a brake caliper (3);
two brake pads (4, 4') on both sides of the brake disc (2), the brake pads movably guided on the brake caliper (3);
a retainer spring (6, 6') on each brake pad (4, 4');
a retainer bracket ($8\text{-}8^{IV}$) for pre-tensioning the retainer springs (6, 6') in relation to the respective brake pad (4, 4'); and
an expander spring (10, 10') that applies an expansion force in an effective direction between the brake pads (4, 4') and diverging the brake pads (4, 4');
wherein the disc brake (1) includes a loss prevention device operatively connected to the expander spring (10, 10'), wherein the expander spring (10, 10') in the absence of the expansion force is held on the disc brake (1);
a guide part (20-20') that receives the expander spring (10, 10') and at least partially guides the expander spring in the effective direction of the expansion force;
wherein the guide part (20'-20''') has at least one first guide mandrel (24-24') which is disposed on the retainer bracket ($8'\text{-}8^{IV}$) and extends in a clearance (22') on the retainer bracket ($8'\text{-}8^{IV}$).

6. The disc brake as claimed in claim 5, wherein the guide part (20-20''') is configured as a bar element and is at least partially surrounded by the expander spring (10, 10').

7. The disc brake as claimed in claim 5, wherein the guide part (20) and the expander spring (10, 10') are disposed in a clearance (22) of the retainer bracket (8) and movable at least in the effective direction of the expander spring (10, 10').

8. The disc brake as claimed in claim 5, wherein the guide mandrel (24-24') is a first guide mandrel, and the guide part (20'-20''') in addition to the first guide mandrel (24-24') has a second guide mandrel (26-26'), wherein the first guide mandrel (24-24") and the second guide mandrel (26-26") extend toward one another from opposite ends of the retainer bracket ($8'\text{-}8^{IV}$), wherein the first guide mandrel (24, 24') and the second guide mandrel (26, 26') have dissimilar lengths.

9. The disc brake as claimed in claim 8, wherein at least one end (14, 14') of the expander spring (10') has a slide (40, 40') which is movable along the guide part (20', 20''') and covers a spacing ($X_1$) between the first guide mandrel (24') and the second guide mandrel (26").

10. The disc brake as claimed in claim 8, wherein the first guide mandrel (24, 24') and the second guide mandrel (26, 26'), for inserting the expander spring (10, 10'), terminate at a mutual spacing (X), the spacing (X) between the ends of the first and the second guide mandrel (24, 24', 26, 26') being smaller than a block length ($L_B$) of the expander spring.

11. The disc brake as claimed in claim 8, further comprising a mating part (30) which, has mountings (32) that fasten to the first and the second guide mandrel (24, 24', 26, 26') for connecting the ends of the first and the second guide mandrel (24, 24', 26, 26').

12. The disc brake as claimed in claim 8, wherein at least the first or the second guide mandrel (24", 26') is movable in a reciprocating manner between an operating position and an assembling position for assembling the expander spring (10, 10').

13. The disc brake as claimed in claim 2, further comprising a cover (34) which is specified for at least in portions covering the expander spring (10, 10') on the retainer bracket ($8\text{-}8^{IV}$).

14. The disc brake as claimed in claim 13, wherein the cover (34) is part of a protective cap (38) that shields the brake caliper (3) on the upper side thereof.

15. The disc brake (1) as claim in claim 5, wherein the ends of the expander spring (10, 10') bear in each case directly on one of the retainer springs.

16. The disc brake (1) as claimed in claim 1, wherein the disc brake (1) includes a loss prevention device operatively connected to the expander spring (10, 10'), wherein the expander spring (10, 10') in the absence of the expansion force is held on the disc brake (1).

17. The disc brake (1) as claimed in claim 1, further comprising a guide part (20-20''') that receives the expander spring (10, 10') and at least partially guides the expander spring in the effective direction of the expansion force.

18. A kit for a brake caliper of a disc brake having brake pads on both sides of the brake disc thereof, comprising:
a retainer bracket ($8\text{-}8^{IV}$) for pre-tensioning retainer springs (6, 6') of the brake pads; and an expander spring (10, 10') for applying an expansion force in an effective direction between the brake pads and for diverging the brake pads, the ends of the expander spring configured for being brought to bear in each case directly on a retainer spring (8-8$^{IV}$); and
a guide part (20-20''') which at least in portions receives the expander spring (10, 10') in the longitudinal orientation and at least partially guides the expander spring in the effective direction of the expansion force;
wherein the guide part (20'-20''') has at least one first guide mandrel (24-24') which is disposed on the retainer bracket (8'-8$^{IV}$) and extends in a clearance (22') on the retainer bracket (8'-8$^{IV}$).

\* \* \* \* \*